United States Patent
Kent et al.

(10) Patent No.: US 11,947,617 B2
(45) Date of Patent: *Apr. 2, 2024

(54) ASSIGNING VARIANTS OF CONTENT TO USERS WHILE MAINTAINING A STABLE EXPERIMENTAL POPULATION

(71) Applicant: Maplebear Inc., San Francisco, CA (US)

(72) Inventors: Ogden Kent, San Francisco, CA (US); Benjamin David Bader, Boulder, CO (US); Jeffrey Bernard Arnold, Oakland, CA (US)

(73) Assignee: Maplebear Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/205,949

(22) Filed: Jun. 5, 2023

(65) Prior Publication Data

US 2023/0350970 A1 Nov. 2, 2023

Related U.S. Application Data

(63) Continuation of application No. 17/704,101, filed on Mar. 25, 2022, now Pat. No. 11,704,382, which is a continuation of application No. 17/180,547, filed on Feb. 19, 2021, now Pat. No. 11,314,836.

(51) Int. Cl.
*G06F 16/958* (2019.01)
*G06F 11/34* (2006.01)
*G06F 16/957* (2019.01)
*G06F 40/143* (2020.01)

(52) U.S. Cl.
CPC ...... *G06F 16/9577* (2019.01); *G06F 11/3476* (2013.01); *G06F 16/958* (2019.01); *G06F 40/143* (2020.01)

(58) Field of Classification Search
CPC ............. G06F 16/9577; G06F 11/3476; G06F 16/958; G06F 40/143
See application file for complete search history.

(56) References Cited

U.S. PATENT DOCUMENTS

| | | |
|---|---|---|
| 9,571,570 B1 | 2/2017 | Mutnuru |
| 2006/0047844 A1 | 3/2006 | Deng |
| 2007/0271511 A1 | 11/2007 | Khopkar et al. |
| 2012/0239537 A1 | 9/2012 | Baker et al. |
| 2014/0188612 A1* | 7/2014 | Chou ............... G06Q 30/0257 705/14.55 |
| 2016/0124839 A1 | 5/2016 | Mordo et al. |
| 2017/0168924 A1 | 6/2017 | Dereszynski et al. |

(Continued)

OTHER PUBLICATIONS

Resch, J., "New Hashing Algorithms for Data Storage," Storage Developer Conference, Sep. 2015, pp. 1-47.

(Continued)

*Primary Examiner* — Keith D Bloomquist
(74) *Attorney, Agent, or Firm* — Fenwick & West LLP

(57) ABSTRACT

A variation testing system environment for performing variation testing of web pages and applications is disclosed. The variation testing system applies a weighted consistent hash function to user attributes of users to assign the users to a variant of a web page that is undergoing experimentation. The usage of the weighted consistent hash function allows for a stable experimental population.

20 Claims, 12 Drawing Sheets

(56) References Cited

U.S. PATENT DOCUMENTS

2018/0315077 A1\* 11/2018 Donnelly ......... G06Q 10/06398
2018/0341975 A1  11/2018 Fellows
2019/0057118 A1   2/2019 Appikatala et al.
2019/0196941 A1   6/2019 Sahni et al.
2019/0278438 A1   9/2019 Boyd et al.

OTHER PUBLICATIONS

United States Office Action, U.S. Appl. No. 17/180,547, dated Dec. 8, 2021, 11 pages.
United States Office Action, U.S. Appl. No. 17/704,101, dated Jan. 12, 2023, 12 pages.

\* cited by examiner

ASSIGNING VARIANTS OF CONTENT TO USERS WHILE MAINTAINING A STABLE EXPERIMENTAL POPULATION

CROSS-REFERENCE TO RELATED APPLICATION

This application is a continuation of U.S. patent application Ser. No. 17/704,101 filed on Mar. 25, 2022, which is a continuation of U.S. patent application Ser. No. 17/180,547 filed on Feb. 19, 2021, now U.S. Pat. No. 11,314,836, each of which is hereby incorporated by reference in its entirety.

FIELD OF TECHNOLOGY

The embodiments described herein pertain in general to conducting experiments on content and more particularly to determining which variant of content that is undergoing an experiment to display to users in a manner that maintains a stable experiment population.

BACKGROUND

Content variation testing is an experiment that tests changes to content against other variants of the content. One example of content variation testing is an experiment that tests changes to a web page against one or more different changes in other variants of the web page. During the experiment, changes to a web page that produce positive results are determined. The positive results associated with a particular change to a web page that is included in a variant validates which variant of the web page to use in a production version of the web page, for example. However, conventional variation testing is unable to maintain a consistent distribution of users across different variants when changes to an experiment occur such as changing of variant weights, adding variants, or removing variants from the experiment.

BRIEF SUMMARY

The embodiments herein describe a variation testing system environment for performing variation testing of content such as a web page. Users issues requests for a web page from a content provider where the web page is undergoing experimentation. The experiment for the web page may include multiple variants of the web page that are provided to the different users that request the web page. Each variant of the web page may have a different version of a particular feature of the web page. In one embodiment, the content provider uses a hashing function such as a weighted consistent hash function to assign the users to one of the variants of the experiment. User interactions with the different variants of the web page are monitored according to one or more performance metrics to determine which variant is "winning" the experiment.

Any subsequent requests by the users to view the web page again results in the content provider either maintaining the previously assigned variant for each user or reassigning the user to a different variant. The content provider may provide the previously assigned variant to a user if that user was previously provided the variant that is "winning" the experiment. However, the content provider may reassign the user to the "winning" variant if the user was previously assigned to a "losing" variant in the experiment. In one embodiment, the weighted consistent hash function used by the content provider inherently handles the re-distribution of users responsive to subsequent requests for the content from the users. Using the weighted consistent hash function to assign users to variants allows for a stable population of users in the experiment even if changes to the experiment occur such as changing of variant weights or removing variants from the experiment.

Features and advantages described in this summary and the following detailed description are not all-inclusive. Many additional features and advantages will be apparent to one of ordinary skill in the art in view of the drawings, specification, and claims hereof.

The figures depict an embodiment for purposes of illustration only. One skilled in the art will readily recognize from the following description that alternative embodiments of the structures and methods illustrated herein may be employed without departing from the principles described herein.

DETAILED DESCRIPTION

Figure 1:
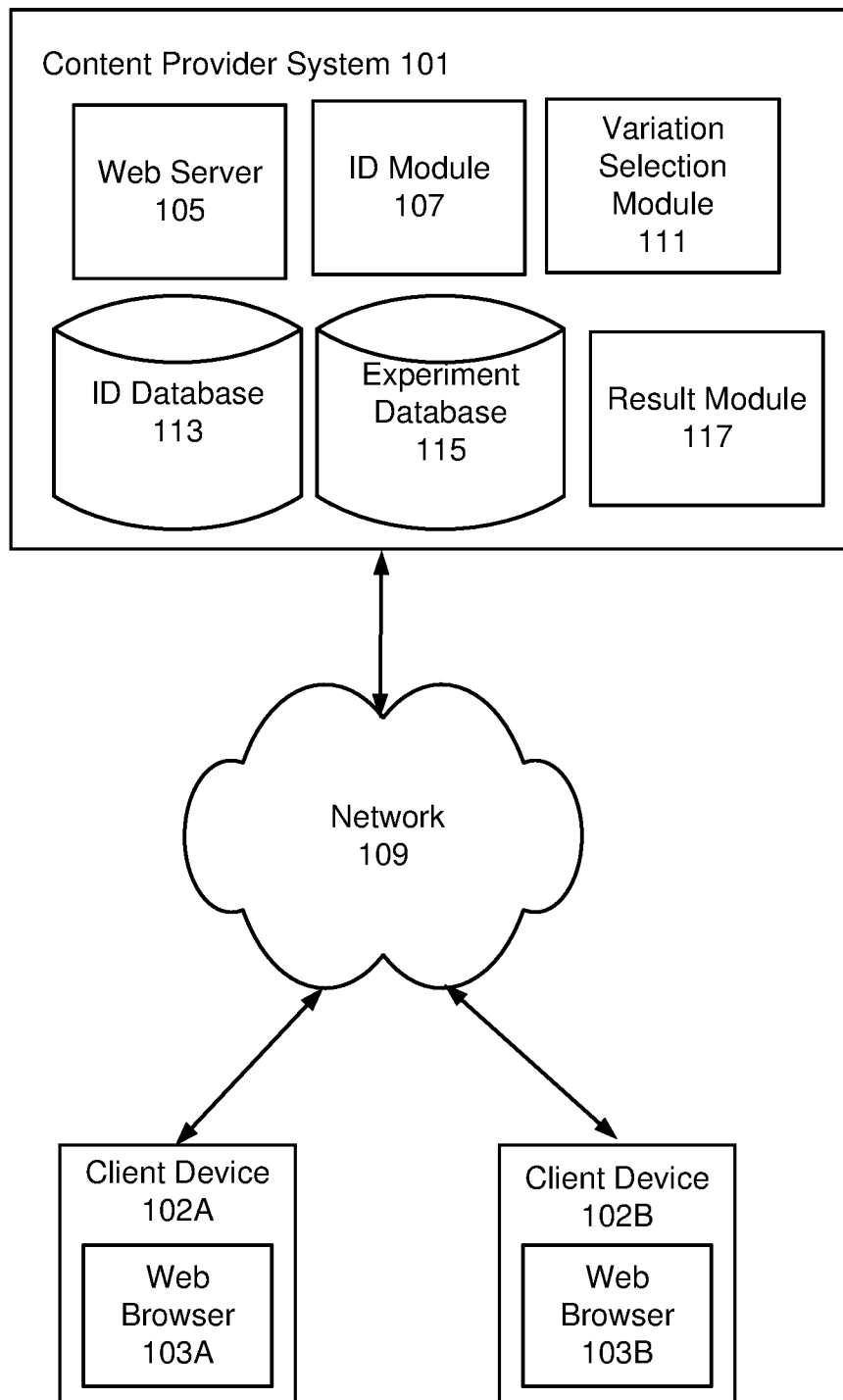
FIG. 1 is a block diagram of a variant testing system environment according to one embodiment.

FIG. 1 is a block diagram of a variant testing system environment 100 according to one embodiment. Environment 100 includes client devices 102 (e.g., client device 102A and client device 102B). In one embodiment, client device 102A is a device of a first user and client device 102B is a device of a second user. Client device 102A may represent one or more devices of the first user and client device 102B may represent one or more devices of the second user. Client devices 102 are connected to a content provider system 101 via a network 109. Although the environment 100 shown in FIG. 1 only includes two client devices 102, the environment 100 can include any number of client devices (e.g., thousands of client devices 102).

FIG. 1 and the other figures use like reference numerals to identify like elements. A letter after a reference numeral, such as "102A," indicates that the text refers specifically to the element having that particular reference numeral. A reference numeral in the text without a following letter, such as "102," refers to any or all of the elements in the figures bearing that reference numeral.

Network 109 enables communication among the entities connected to it. In one embodiment, network 109 is the Internet and uses standard communications technologies and/or protocols. Thus, network 109 can include links using technologies such as Ethernet, 802.11 (WiFi), worldwide interoperability for microwave access (WiMAX), 3G, 4G, 5G, Long Term Evolution (LTE), digital subscriber line (DSL), asynchronous transfer mode (ATM), InfiniBand, etc. Similarly, the networking protocols used on network 109 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 109 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In one embodiment, network 109 may include but is not limited to any combination of a local area network (LAN), a metropolitan area network (MAN), and a wide area network (WAN). In another embodiment, the entities use custom and/or dedicated data communications technologies instead of, or in addition to, the ones described above.

Client devices 102 communicate with the content provider 101 via the network 109 to receive content items such as web pages from the content provider 101. In one embodiment, each client device 102 is a computer system capable of communicating with the content provider 101. Examples of client devices 102 include a personal computer, a mobile phone, a tablet, a personal digital assistant (PDA), or a laptop. As shown in FIG. 1, each client device 102 includes a web browser 103 (e.g., web browser 103A and web browser 103B). Web browser 103 is a computer program stored on a client device 102 that allows the user of client 102 to access web pages on the World Wide Web such as web pages provided by the content provider 101. Suitable web browsers include, but are not limited to, GOOGLE CHROME, MICROSOFT INTERNET EXPLORER, MICROSOFT EDGE, MOZILLA FIREFOX, and APPLE SAFARI.

In one embodiment, the content provider 101 may be an individual, a group of individuals, or an entity such as a company. The content provider 101 provides content items to client devices 102. While only one content provider 101 is shown, it is understood that any number of content providers are supported and can be in the environment 100 at any time. In one embodiment, the content items provided by the content provider 101 include web pages. However, the content provider 101 may provide other types of content items such as video, audio, a combination of video and audio, still images (e.g., JPEG), text documents, advertisements, and/or any other types of content. For purposes of convenience and the description of one embodiment, the content items provided by the content provider 101 will be referred to as a web pages, but no limitation on the type of content items are intended by this terminology.

In one embodiment, the content provider 101 performs experimentation on web pages provided by the content provider 101. The content provider 101 may display different variants of a web page to client devices 102 according to an experiment (e.g., a variation test) being performed on the web page by the content provider 101. An experiment for a web page tests changes to one or more features of a web page included in multiple variants of the web page (e.g., the current version of the web page and different variants) to determine whether the changes to the one or more features produce a desired result in a performance metric under evaluation. An example of a performance metric under evaluation is increased conversions (e.g., purchases) of a product advertised on a web page resulting from a change to a feature of a web page. While conversions are one type of performance metric that may be monitored during an experiment, the experiment may be targeted towards any type of performance metric.

Thus, experiments on features of web pages performed by the content provider 101 validates a new design of a web page or changes on features on the web page before the new design or changes are put into production by the content provider 101 such as during a gradual roll out. Experiments performed by the content provider 101 also allow for rollout of the features, a holdback group of users in order to evaluate long-term effects of the features, and multi-armed bandit situations.

In one embodiment, a rollout is when the proportion of users that are exposed to variants is expanded while keeping the population in each variant of the web page as stable as possible. For example, an experiment may have an initial distribution of users to Variants A, B, and C of 10%, 10%, and 80%, respectively. Over time, the distribution of users to Variants A, B, and C may be changed to 30%, 30%, and 40%, respectively.

A holdback group may be implemented when a winner of the experiment is declared, the feature is launched, and a small proportion of the control is kept to understand long-term impacts of the feature corresponding to the winning variant. Consider the example where Variant A is the control and Variants B and C are variants that are being tested. The experiment may have an allocation of 40%, 30%, and 30% to Variants A to C, respectively. If B is declared the winner of the experiment, a new distribution of users to Variants A to C is established such as 5%, 95%, and 0%, respectively. A small percentage of users that are still assigned to the control (e.g., Variant A) is a holdback group and is kept for a predetermined period of time (e.g., 2 months) to understand the longer term impact of declaring Variant B as the winner of the experiment.

Multi-armed bandits and other adaptive sampling methods may vary the proportion of variants assigned or even add or subtract variants. By modifying the proportion of the variants, the value of the feature (e.g. maximize the CTR) may be maximized or the learnings (minimize the time to find the best variant) in the experiments may be maximized.

For a given web page, the content provider 101 may store one or more variants of the web page that are used in an experiment for the web page. In one embodiment, a variation test of a web page involves an experiment that tests an "A" variant known as the control, a "B" variant known as a first variant, and a "C" variant known a second variant. For ease of discussion, the embodiments discussed herein describe a web page having only three variants: the control and two variants. However, in other embodiments, a web page can have any number of variants.

Figure 2A:
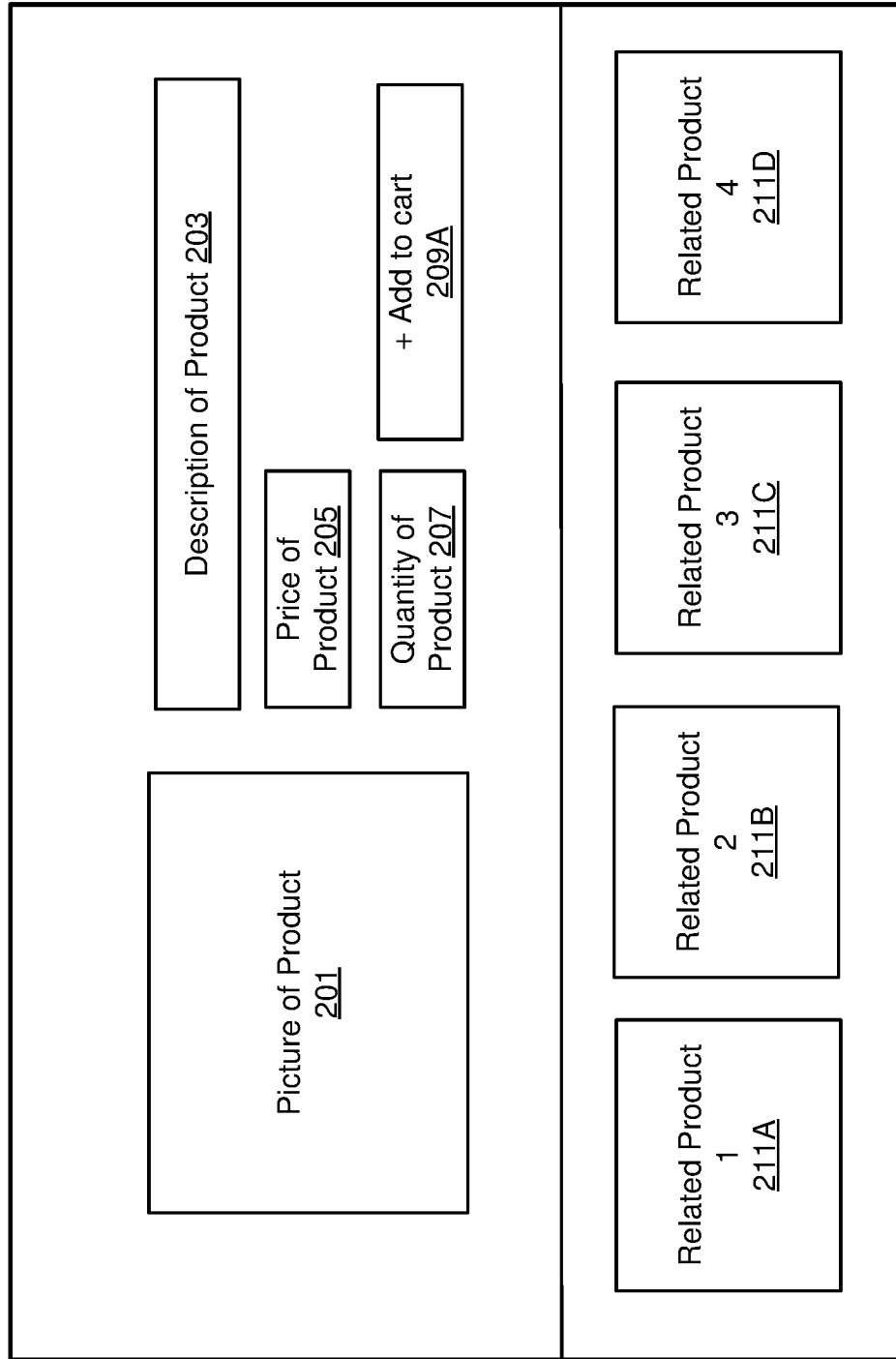
FIGS. 2A to 2C are example variants of a web page according to one embodiment.

FIG. 2A is an example of the "A" variant (e.g., the control variant) of a web page 200A that represents the current implementation of the web page provided by content provider 101. The control variant of the web page 200A includes a plurality of features including a picture of a product 201 being sold on the web page 200A, a description of the product 203, a price 205 of the product, a quantity 207 of the product for purchase, a purchase mechanism 209A, and a plurality of related products 211A to 211D. Any of the features included in the web page 200A may be changed in one or more variants during an experiment. In the example described herein, the experiment performed on the web page 200 tests different purchase mechanisms 209 to see which is more effective in increasing conversions of the product on the web page 200. In the "A" variant shown in FIG. 2A, the purchase mechanism 209A includes the label "+Add to cart".

Figure 2B:
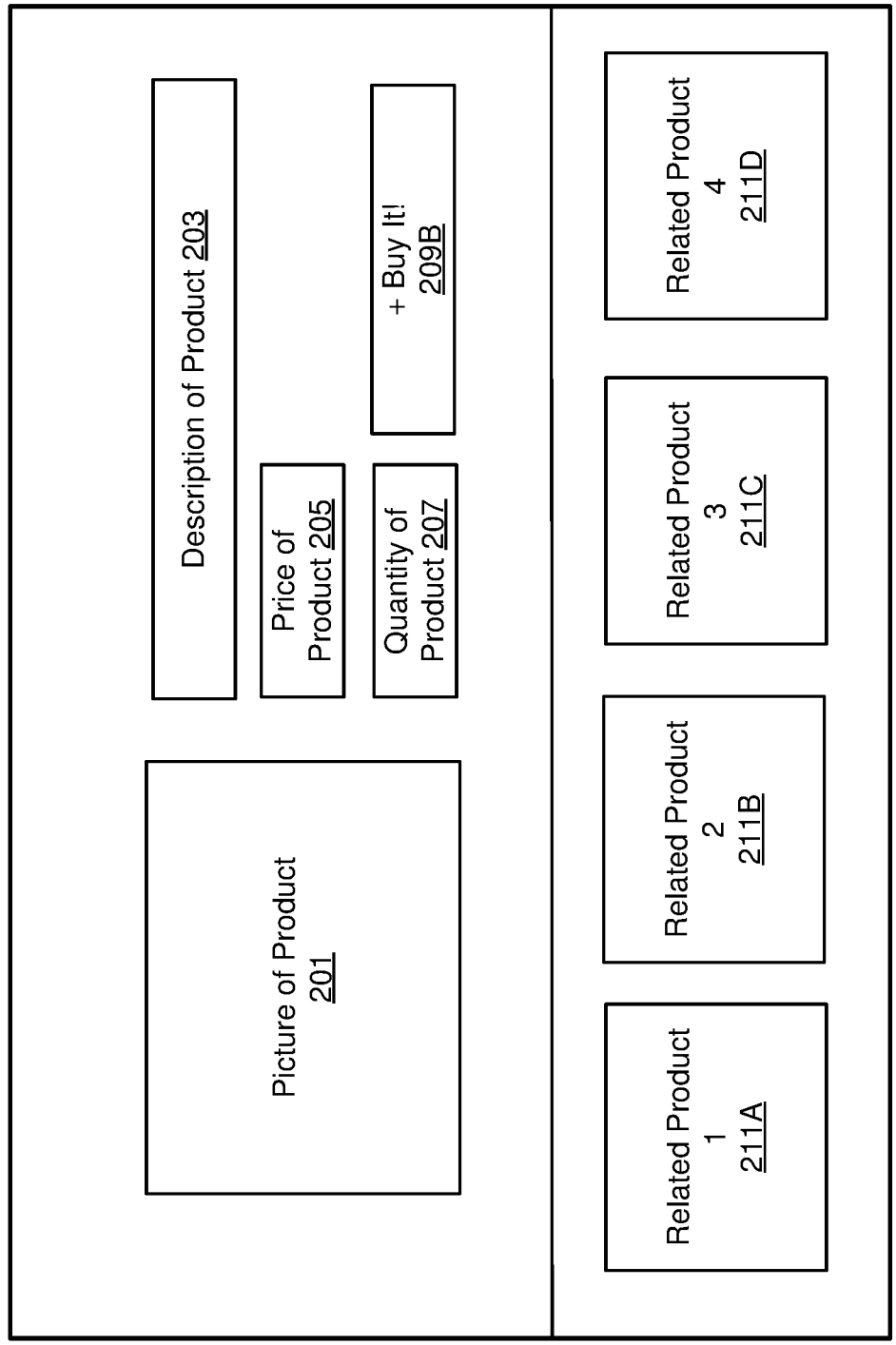

FIG. 2B is an example of a "B" variant of a web page 200B. Web page 200B includes a change (i.e., a modification) to the feature being evaluated. As mentioned above, the purchase mechanism 209 is under evaluation while all other features of the web page remain consistent across the different versions of the web page 200. For example, the picture of the product 201 being sold on the web page 200A, the description of the product 203, the price 205 of the product, the quantity 207 of the product for purchase, and the plurality of related products 211A to 211D are the same across web page 200A to web page 200C shown in FIGS. 2A to 2C. However, the purchase mechanism 209 is different across the different versions of the web page 200. In FIG. 2B, the purchase mechanism 209B includes the label "+Buy It!" rather than the label "+Add to cart" in FIG. 2A.

Figure 2C:
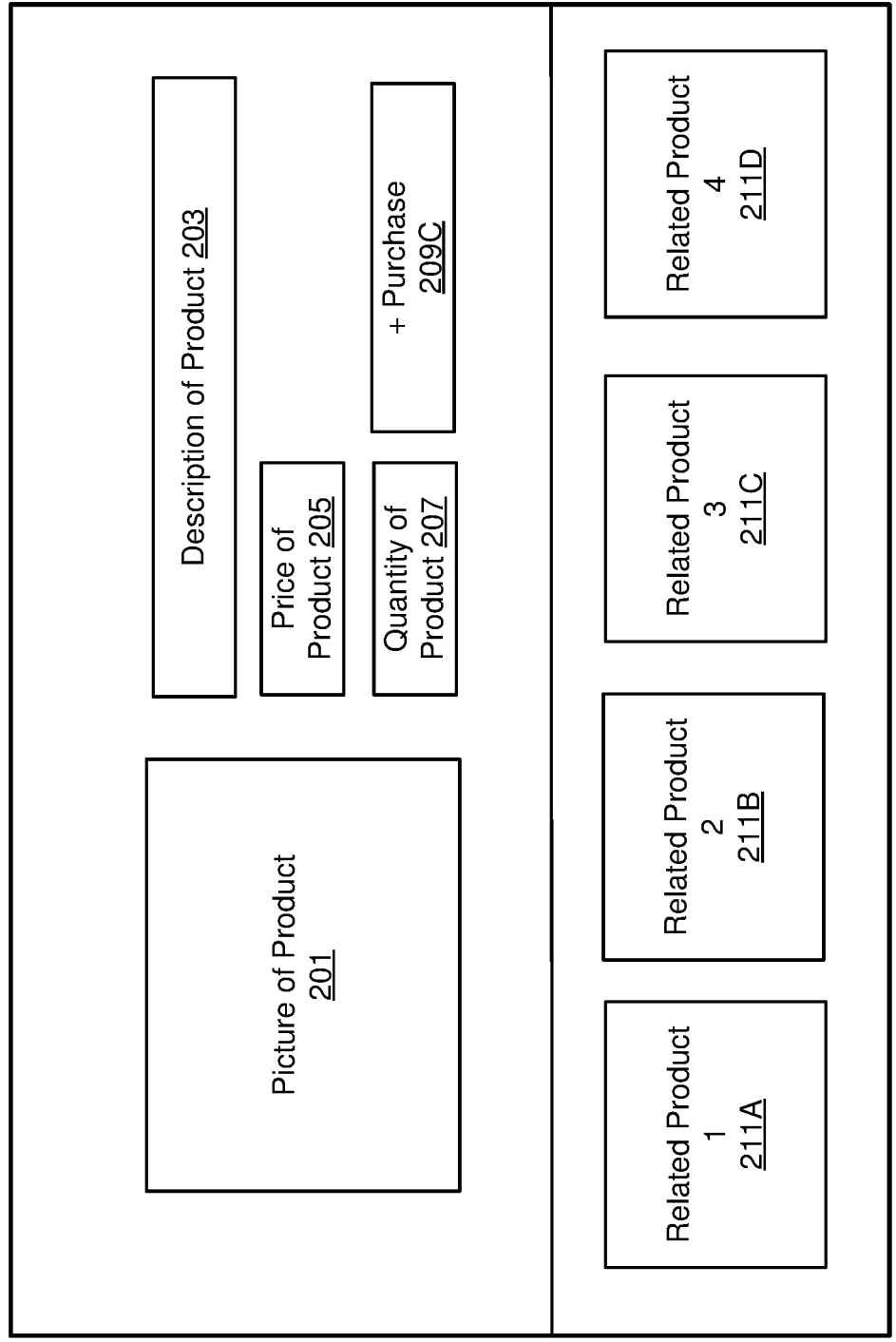

FIG. 2C is an example of a "C" variant of a web page 200C. Web page 200C includes yet another change (i.e., a modification) to the purchase mechanism 209 while the remaining features of the web page 200C are the same as in web pages 200A and 200B. In web page 200C shown in FIG. 2C, the purchase mechanism 209B includes the label "+Purchase". In example shown in FIGS. 2A to 2C, the experiment determines which of the labels for the purchase mechanism 209 result in a higher rate of purchase conversions of the product advertised on the web page 200. The variant with highest rate of purchase conversions may be declared the "winner" of the experiment by the content provider 101.

Referring back to FIG. 1, in one embodiment the content provider 101 includes a web server 105, an identification (ID) module 107, a variation selection module 111, a result module 117, an ID database 113, and an experiment database 115. As is known in the art, the term "module" refers to computer program logic utilized to provide the specified functionality. Thus, a module can be implemented in hardware, firmware, and/or software. In one embodiment, program modules are stored on a non-transitory storage device (i.e., a computer program product), loaded into a memory, and executed by one or more computer processors. Additionally, those of skill in the art will recognize that other embodiments of the content provider 101 shown in FIG. 1 can have different and/or other modules than the ones described here, and that the functionalities can be distributed among the modules in a different manner.

In one embodiment, the experiment database 115 stores multiple (i.e., a plurality) experiment records that describe experiments conducted by the content provider 101. Each experiment record is associated with a web page, an experiment identifier unique to the experiment, and identifiers of different variants of a web page included in the experiment. The experiment identifier may be a numerical identifier or an alphanumeric identifier that describes the name of the feature being tested. An experiment record may also include a description of the change(s) made to the feature(s) of the web page in each variant.

In one embodiment, each experiment stored in the experiment database 115 comprises an associated rule set. A rule set for an experiment includes one or more rules that determine if a feature should be enabled for a user of the client device 102 that requested the web page and if so, which variant should be presented to the user. In one embodiment, each rule defines a criteria about the user that must be valid in order to satisfy the rule so that the user is assigned the variant associated with the rule. In one embodiment, all the rules of a rule set must be satisfied for a user to be targeted.

In one embodiment, a rule included in a rule set may define any type of criteria that must be satisfied in order for a user to be assigned a particular variant of a web page. The criteria for a rule may be based on a user attribute such as the user's user identifier (ID), location (e.g., zip code), type of device platform associated with the user's client device 102 (e.g., iOS or ANDROID). For example, only users in California that are using iOS devices may be included in an experiment of a web page.

In one embodiment, a rule may be a static rule that indicates a large set of explicitly set values which determine which variant a user is assigned to. For example, a static rule may specify that a first threshold of users (e.g., first 1,000 users) that are exposed to the web page receive a first variant of a web page, the second threshold of users (e.g., second 1,000 users) that are exposed to the web page receive a second variant of the web page, and the third threshold of users (e.g., third 1,000 users) that are exposed to the web page receive the third variant of the web page.

In one embodiment, a rule for an experiment may define an exposure rate of users to the experiment. The exposure rate indicates a percentage of users that are exposed to the experiment. In one embodiment, all users may be subject to an experiment (e.g., 100% exposure) or only a percentage of all the users are subject to the experiment. For example, if the exposure rate is 20%, 20% of all users that request a web page that is under experimentation will be assigned to one of the variants of the experiment.

A rule for the experiment may also define weights for each variant included in the experiment. The weight assigned to each variant impacts the distribution of users to each variant. For example, a rule may specify a distribution split between the different variants. The distribution split may be different for the different variants of an experiment. For example, a rule may specify a distribution split of 20% for variant "A", 30% for variation "B", and 50% for variant "C" in the examples shown in FIGS. 2A to 2C. In other embodiments, the distribution split may the same for the different variants. For example, the rule may specify a distribution split of 33.3% for variant "A", 33.3% for variation "B", and 33.4% for variant "C".

In one embodiment, the web server 105 links the content provider 101 to one or more client devices 102 via the network 109. The web server 105 serves content items such as web pages, as well as other web related content. The web server 111 may include a mail server or other messaging functionality for receiving and routing messages between the variation determination system 105 and one or more client devices 102.

The ID module 107 generates user identifiers for users of client devices 102. In one embodiment, the user identifier is used by the user of a client device 102 to log into a web page or application provided by the content provider 107. In one embodiment, a user identifier is a string of numbers that is unique to a particular client device 102. Thus, client device 102A may have a different user identifier than the user identifier for client device 102B.

In one embodiment, the ID module 107 generates a user identifier by automatically incrementing the value of the last user identifier generated by the ID module 113 using an auto increment function. Alternatively, the ID module 107 generates a unique random number and assigns the unique random number as a user identifier for a client device 102. In another embodiment, the ID module 107 may receive a user identifier from a client device 102. The user identifier received from the client device 102 may be generated by the client device 102 or the user identifier may be input by the user into the client device 102. The ID module 107 stores user identifiers in the ID database 113 that maintains a record of all assigned user identifiers.

In one embodiment, responsive to the content provider 107 receiving a request for a web page from a client device, the ID module 107 communicates with the client device 102 to determine whether the client device 102 already has a user identifier. For example, the ID module 107 may query the client device 102 to transmit the user identifier via a login form displayed on the web page. In another example, the ID module 107 queries the client device 102 to determine whether the client device 102 includes a stored cookie that comprises a user identifier for the client device 102. If the client device 102 lacks a cookie with a user identifier for the client device 102, the ID module 107 may query the client device 102 to transmit the user identifier via a login form displayed on the web page. Alternatively, the ID module 107 generates a user identifier for the client device 102 and communicates the user identifier to the client device 102 for storage in a cookie at the client device 102 if the client device 102 lacks a cookie with a user identifier. The client device 102 will continue to use the user identifier generated by the ID module 107 for subsequent requests for the web page.

The variation selection module 111 selects (e.g., assigns) a variant of a web page to provide to a user of a client device 102. In one embodiment, the variation selection module 11 selects the variant from a plurality of different variants of the web page undergoing an experiment. The variation selection module 111 may receive client device requests for web pages from the web server 105. For each received request, the variation selection module 111 determines whether the user associated with the request is subject to the experiment and if so, selects a variant for assignment to the user. For example, the variation selection module 111 determines whether to provide the variant "A", variant "B", or variant "C described above.

In one embodiment, the request received by the variation selection module 11 includes user attributes such as at least a user identifier of the client device 102 that requested the web page. In addition, the request may also include other user attributes such as the location of the client device (e.g., the zip code) and/or the platform of the client device 102 (e.g., iOS or ANDROID). The variation selection module 111 determines which variant of a web page to provide to a client device 102 based on one or more of the user attributes.

In one embodiment, the variation selection module 111 selects a variant to provide to a user's client device using a hash function. The variation selection module 111 applies the hash function to the user identifier to generate a hashed user identifier. The hashed user identifier may be a numeric string. For example, if the user identifier is "367" the application of the function to the user identifier results in the hashed user identifier "12367." In another embodiment, the variation selection module 111 applies the hash function to a combination of the user identifier and any other features such as the experiment identifier and/or other user attributes. The combination of the user identifier and the experiment identifier may be a concatenation of the user identifier and the experiment identifier, for example. In one embodiment, the function applied by the variation selection module 111 to a user identifier is a weighted consistent hash function such as the Weighted Rendezvous Hash function. However, other weighted consistent hash functions may be used.

In one embodiment, the variation selection module 111 normalizes the hashed user identifier to create an assignment identifier that is the basis for assigning the user to a variation of a web page. Normalizing the hashed user identifier restricts the assignment identifier to a fixed interval such as [0, 1]. To normalize the hashed user identifier, the variation selection module 111 divides the hashed user identifier by the maximum possible value of the hashed user identifier. Thus, in one embodiment the assignment identifier for the client device 102 is the quotient of the hashed user identifier and the maximum possible value for the hashed user identifier. In this way, the range of values for the output of the hash function is mapped to the range [0, 1].

In one embodiment, the variation selection module 111 determines which variant of a web page to provide to a client device 102 based the assignment identifier for the client device 102. In one embodiment, the variation selection module 111 compares the user attributes and the assignment identifier to a rule set for the experiment of the web page to determine whether the user is subject to the experiment, and if so, selects a variant to present to the user's client device 102 based on the comparison.

For example, the variation selection module 111 applies the weighted consistent hash function to the user attribute (e.g., the user identifier and experiment identifier) to generate the assignment identifier. Next the variation selection module 111 applies the assignment identifier and any user attributes to the rule set for the experiment, as applicable.

Consider the example where the experiment includes a rule specifying that the experiment is applied to 20% of all users. Thus, only 20% of all possible assignable assignment identifiers will be eligible for the experiment (e.g., 1.0 (all users)*0.20 (exposure percentage)=0.2 (assignable assignment identifiers)).

Furthermore, the experiment may also include a variation split of 20% for variant "A", 30% for variant "B", and 50% for variant "C". The variation selection module 111 determines bounds of assignment identifiers which are used to assign a user to one of the variants. For example, the variation selection module 111 may determine the following bounds for each variant in the experiment from the rule set for the experiment:

A: $0.00<X<=0.04$ (e.g., 0.2 (assignable assignment identifiers)*0.2 (A percentage);

B: $0.04<X<=0.10$ (e.g., middle bound between A and C); and

C: $0.10<X<=0.20$ (e.g., 0.2 (assignable assignment identifiers)*0.5 (C percentage)=0.10 with 0.20 being the maximum possible exposure rate).

In the mapping above, X is the assignment identifier of the user. The rule set for the experiment may define a mapping between a set of different ranges of assignment identifiers and a corresponding set of variants of the web page. This mapping may be implemented by, for example, a table of different ranges of assignment identifiers and corresponding variations of the web page wherein, the variation selection module 111 selects from the table of assignment identifiers a variant of the web page that corresponds to the assignment identifier for the client device 102.

For example, the rule set above may describe a first range of assignment identifiers that is associated with variant A of the web page, a second range of assignment identifiers that is associated with variant B of the web page, and a third range of assignment identifiers that is associated with variant C of the web page. The variation selection module 111 determines whether the assignment identifier is included in the first range of assignment identifiers, the second range of assignment identifiers, or the third range of assignment identifiers. The variation selection module 111 then selects the variant of the web page associated with the range of assignment identifiers that includes the assignment identifier for the user of the client device 102.

Once the variation selection module 111 determines which variant of the web page should be provided to the client device 102, the variation selection module 111 transmits a notification to the web server 105. The notification instructs the web server 105 to provide a particular variant of the web page to the client device 102 that requested the web page. In one embodiment, the variation selection module 111 may also store in the experiment database which variant was assigned to each user to track the history of assignments.

In one embodiment, the variation selection module 111 receives a subsequent request for a web page from a client device 102. The variation selection module 111 has already previously assigned a variant of the web page to the client device 102. The variation selection module 11 determines whether to maintain the previously assigned variant or re-assign another variant of the web page to the client device 102.

To determine whether to maintain the previously assigned variant ore re-assign the variation, the variation selection module 111 may determine a performance metric of each of the different variants responsive to the request. The performance metric may be calculated by the results module 117 and provided to the variation selection module 111 as will be further described below. The variation selection module 111 selects either the previously assigned variant of the web page or another variant of the web page to provide to the client device 102 based on the performance metrics of the variants of the web page. For example, if the previously assigned variant is the variant with the "best" performance metric then the assignment is maintained. However, if another one of the variants of the web page has the "best" performance metric, the variation selection module 111 re-assigns the variant with the "best" performance metric to the client device 102.

In one embodiment, the result module 117 tracks data describing user interactions of web pages by users of client devices 102. Interactions include conversions that occur on each of the different variants. The result module 117 determines from the data the results of the experiment of the web page based on the interactions. The interactions are indicative of a performance metric for each variant. For example, the result module 117 determines based on the interaction data that a higher percentage of conversions (e.g., a performance metric) occurred in variant C compared to variants A and B. Thus, based on the results of the experiment, the content provider 101 may promote variant C of the web page as the control version of the web page thereby replacing the original control version of the web page.

Generally, an experiment is ended when it has been conducted for a long enough period of time such that a large enough sample size is acquired to achieve a predetermined level of statistical power. As mentioned above, a weighted consistent hash function may be used to assign users to variants. The weighted consistent hash function allows the use of standard statistical methods such as sequential statistical methods to decide when to end an experiment.

In one embodiment, the result module 117 may determine the results of the experiment based on various criteria. For example, the result module 117 may determine the results after a threshold amount of time has passed since the experiment was started (e.g., 3 months). In another example, the result module 117 may determine the results after a threshold number of users were exposed to the experiment (e.g., 1000 users). In yet another example, the result module 117 may determine the results when one or more metrics of interest show a statistically significant improvement and counter metrics show no degradation. The result module 117 may also end an experiment at any time due to operational or business concerns. However, any types of criteria may be used to end an experiment.

Figure 3A:
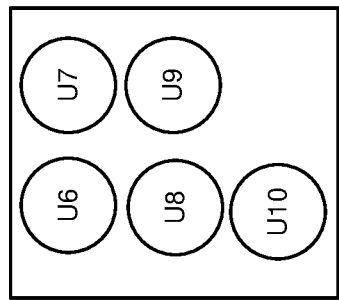
FIGS. 3A to 3C are diagrams illustrating a stable experimental population according to one embodiment.
Figure 3A:
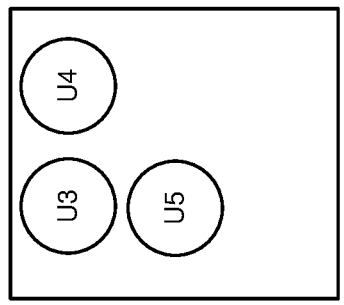
Figure 3A:
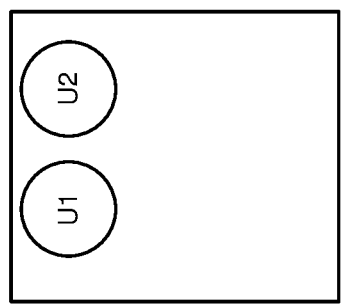

As mentioned above, the variation selection module 111 applies a weighted consistent hash function such as the Weighted Rendezvous Hash function to a user identifier to generate the assignment identifier. Using the weighted consistent hash function beneficially maintains a stable experimental population. Even when the variant weights change or a variant is removed from an experiment, the users that are assigned to the variant that is "winning" the experiment variant (e.g., has more conversions) remain assigned to the variant and any subsequent requests from users that were previously assigned to non-winning variants are subsequently re-assigned to the "winning" variant due to the usage of the weighted consistent hash function as is illustrated in FIGS. 3A to 3C.

As described with respect to FIGS. 2A to 2C, an experiment on a web page that is testing different versions of the purchase mechanism may include three different web page variations: variant A, variant B, and variant C. The variation distribution defined by the rule set for the experiment may specify that 20% of users receive variant A, 30% of users receive variant B, and 50% of users receive variant C. FIG. 3A illustrates the above distribution where a total of ten users have been assigned to the experiment. As shown in FIG. 3A, two of the ten users (e.g., users U1 and U2) are initially assigned to variant A, three of the ten users (e.g., users U3 to U5) are initially assigned to variant B, and five of the ten users (e.g., users U6 to U10) are initially assigned to variant C.

Figure 3B:
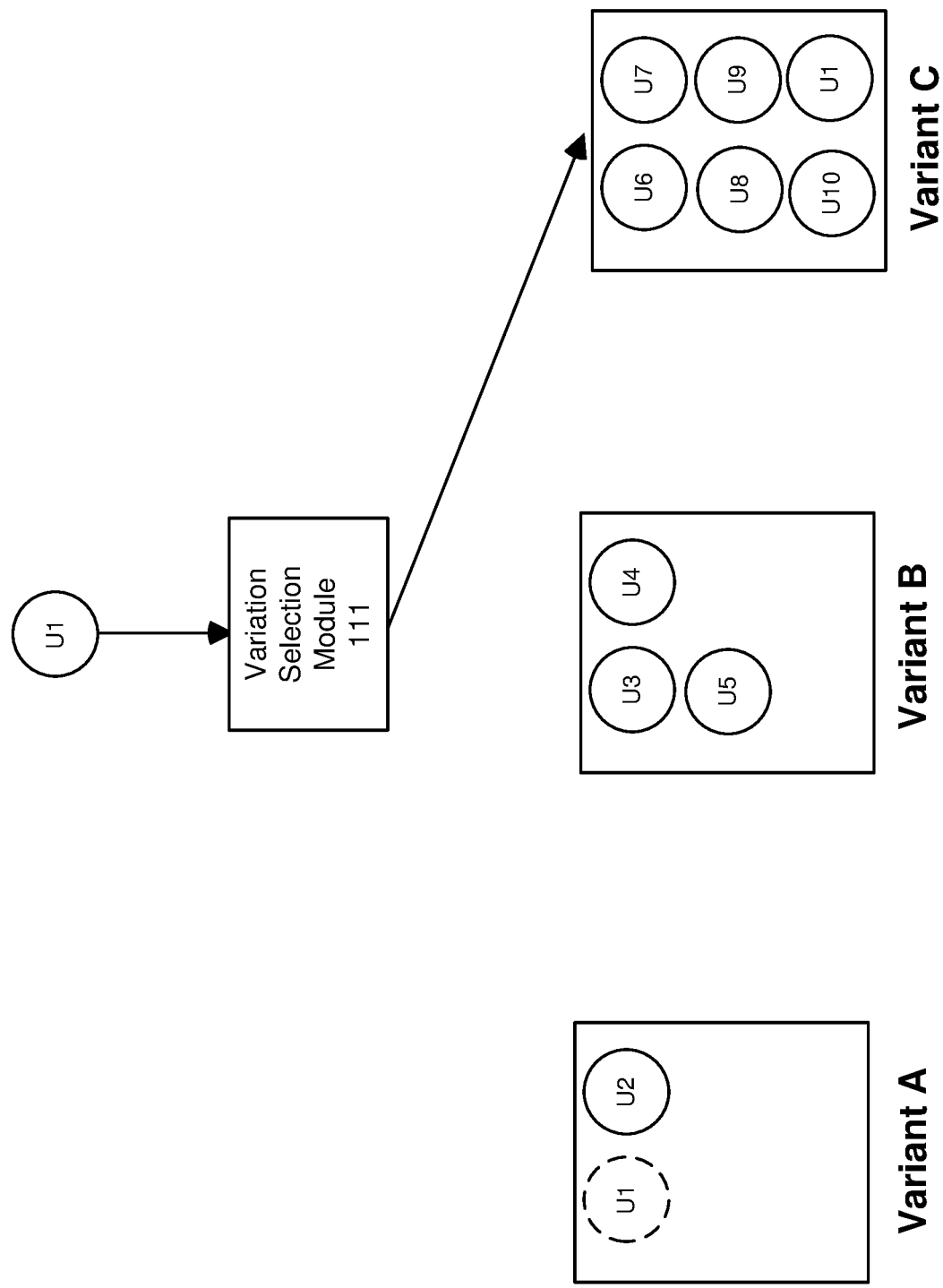

FIG. 3B illustrates the re-assignment of a user to a "winning" variant. A user U1 may have been initially assigned to variant A and may subsequently request to receive the web page at a later instance in time. The variation selection module 111 receives the request from the user U1 and may re-assign the user to the "winning" variant which is variant C in this example as a result of the application of the weighted consistent hash function to the assignment identifier of user U1. Variant C may be determined to be the "winning" variant as it has the highest conversion rate for example.

Figure 3C:
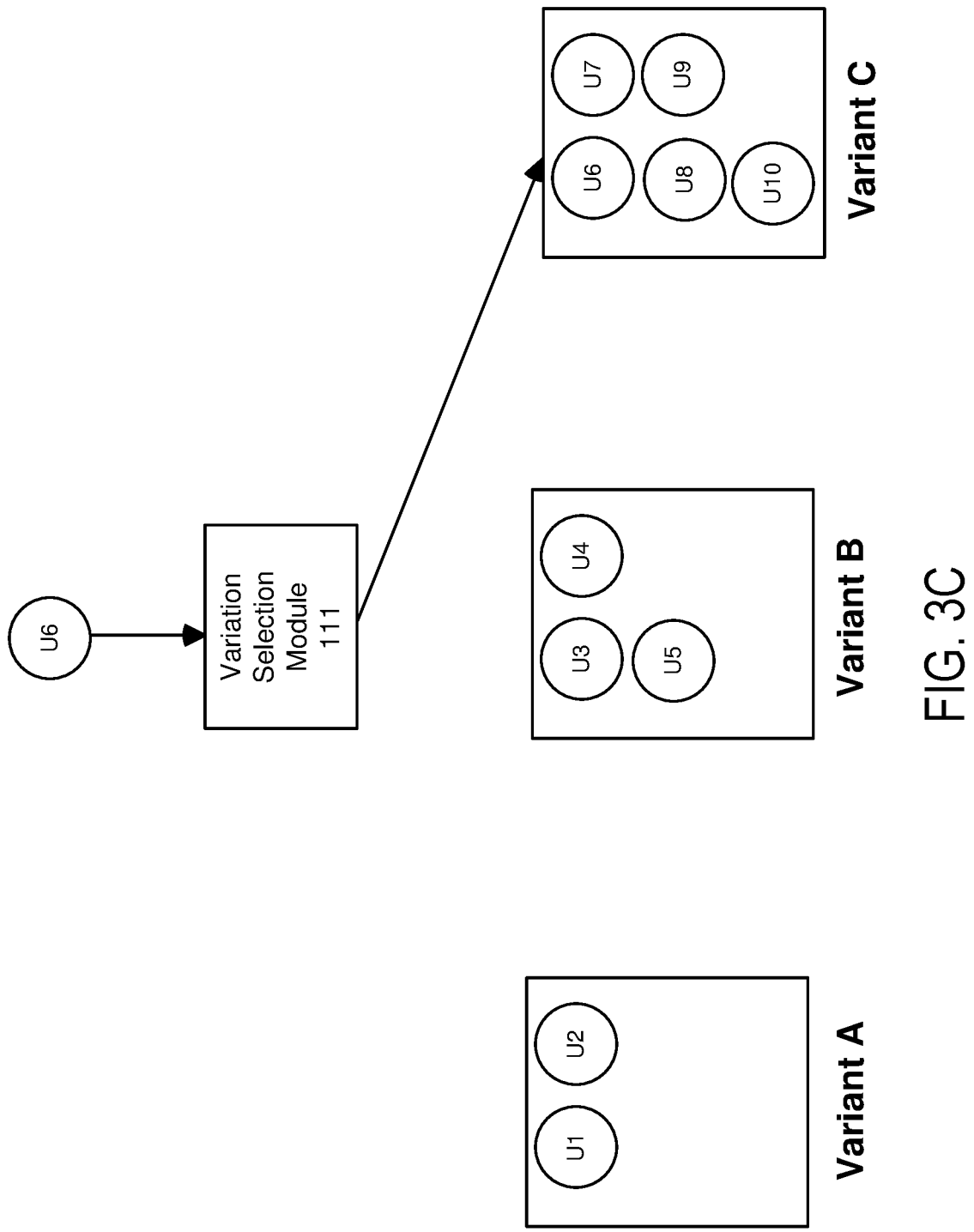

FIG. 3C illustrates maintaining users that are already assigned to a "winning" variant. A user U6 may have been initially assigned to variant C and may subsequently request to receive the web page at a later instance in time. The variation selection module 111 receives the request from the user U6 and may maintain the assignment of user U6 to variant C since variant C is the "winning" variant. Thus, the usage of the weighted consistent hash function in the assignment of user's to variants of an experiment allows for implementing certain experiment designs that require changing variant weights such as gradual roll outs, holdback groups for evaluating long-term effects, and multi-armed bandits.

Figure 4:
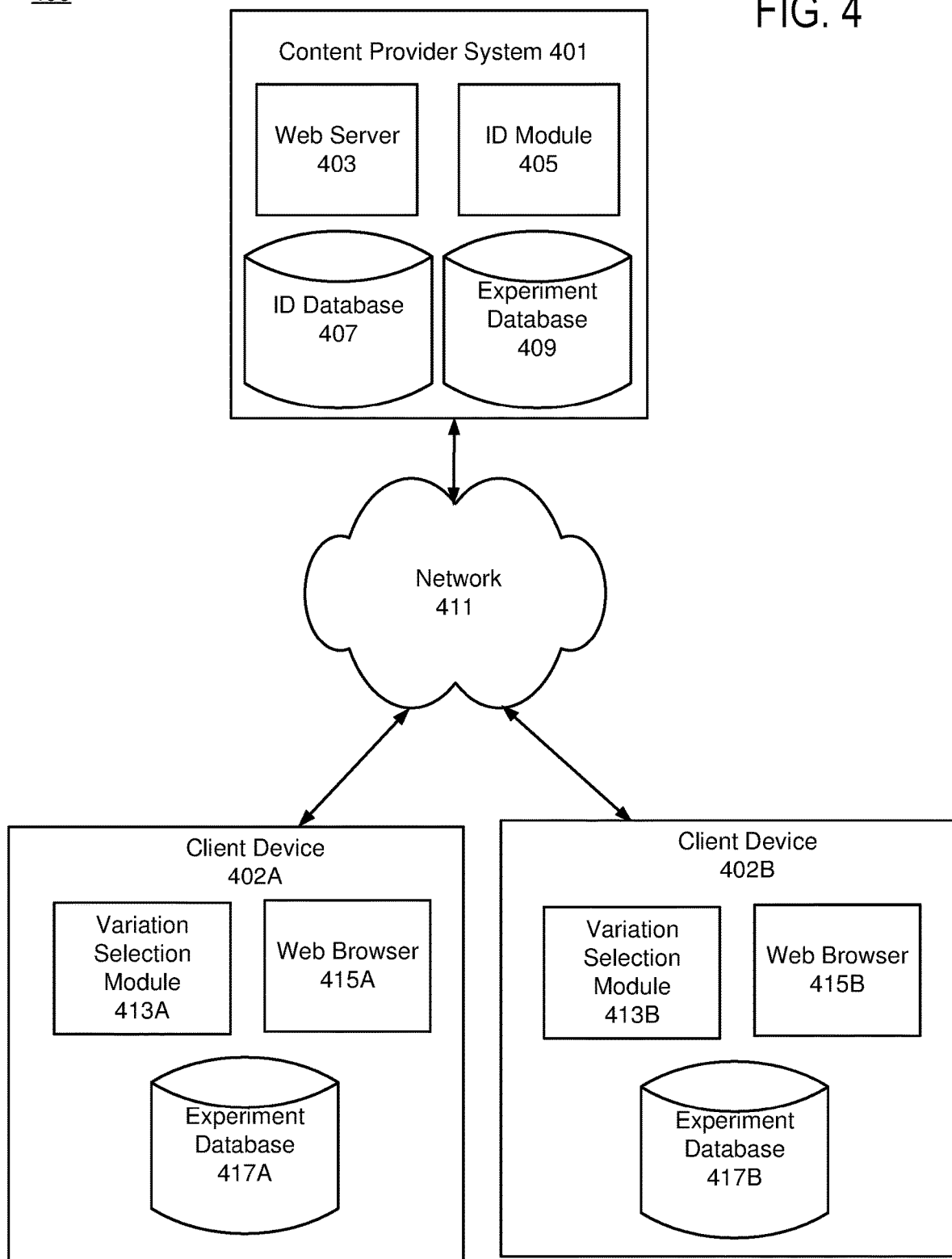
FIG. 4 is a block diagram of a variant testing system environment according to another embodiment.

FIG. 4 is a block diagram of a variant testing system environment 400 according to an alternative embodiment. As shown in FIG. 4, environment 400 includes client devices 402 in communication with a content provider 401 via network 411. The content provider 401 includes a web server 403, an ID module 405, an ID database 407, and an experiment database 409 which perform similar functionality as described with respect to FIG. 1. Thus, the description of similar functionality in FIG. 4 is omitted.

However, in contrast to the embodiment shown in FIG. 1, the content provider 401 lacks functionality for selecting a variant of a web page for display on a client device. Rather, the client devices 402 include the variation determination functionality of the content provider shown in FIG. 1. Thus, the client devices 402 themselves determine which variant of a web page to provide on the client device 402 without consulting the content provider 401.

In one embodiment, a client device 402 includes a variation selection module 413, a web browser 415, and an experiment database 417. The experiment database 417 may be an exact copy of the experiment database 409 stored in the content provider 401. The content provider 401 may include the experiment database 409 merely to maintain a record of the experiments being conducted by the client devices. The components of the client devices 402 shown in FIG. 4 perform similar functionality as their respective components described above with respect to FIG. 1 and are omitted for ease of description.

For example, a client device 402A may receive a request from a user of the client device 402A for a web page from a content provider 400. The variation selection module 413A of client device 402A applies the weighted consistent hash function such as the Weighted Rendezvous Hash function to user attributes of the client device 402 (e.g., the user identifier of the client device 102 or a concatenation of the user identifier and experiment identifier (e.g., retrieved from the experiment database 417A) of the requested web page to generate an assignment identifier. The variation selection module 413A may select which variation of a web page should be displayed on the client device 402A according to the assignment identifier and the rule set for the experiment that is stored in the experiment database 417A. The client device 402A requests the selected variant of the web page from the content provider 401 and receives the selection variant of the web page from the content provider 401.

Providing Variations of Web Pages

Figure 5:
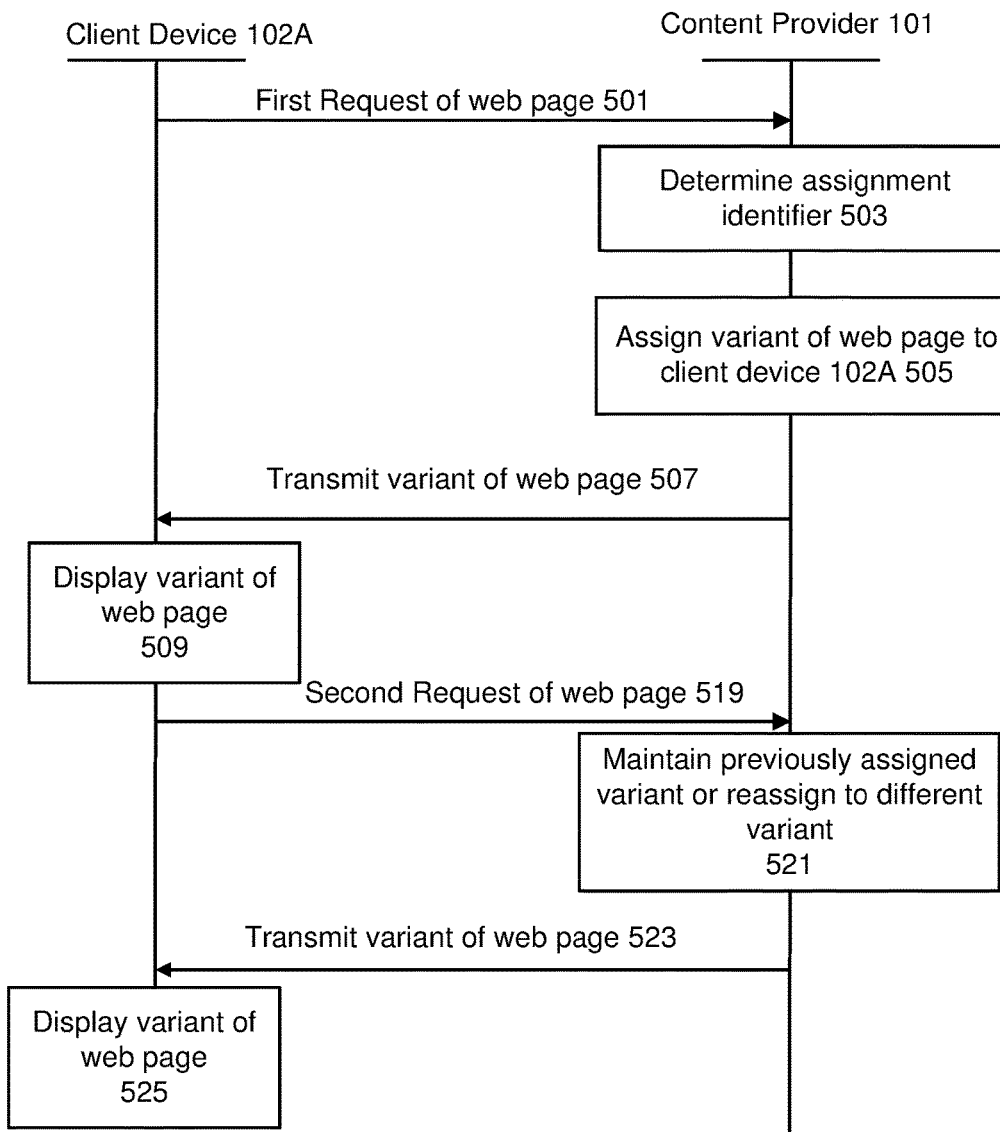
FIG. 5 is an interaction diagram of a process for providing a variant of a web page to a client device according to the embodiment of FIG. 1.

FIG. 5 is an interaction diagram of a process for providing a variant of a web page to a client device 102A according to the embodiment shown in FIG. 1. The interaction diagram illustrates the steps performed by client device 102A and content provider 101 according to one embodiment.

Client device 102A transmits a first request 501 of a web page to the content provider 101. In one embodiment, the web page requested by the client device 102 is undergoing an experiment where there are multiple variants of the web page available where each variant has a different feature of the web page that is best tested. For example, each variant of the web page may have a different purchase mechanism used to purchase a product as described with respect to FIGS. 2A to 2C.

The content provider 101 determines 503 an assignment identifier for the client device 102A. In one embodiment, the assignment identifier is used by the content provider 101 to select one of the multiple variants of the web page to provide to the client device 102A. The assignment identifier for the client device 102A may be determined from the user identifier for example. In other embodiments, the assignment identifier may be determined from any other user attribute such as location, device type of the client device 102A used by the user, etc.

The content provider 101 assigns 505 a variant from the multiple variants of the web page to the client device 102 based on the assignment identifier. The content provider 101 transmits 507 the assigned variant of the web page to the client device 102A based on the assignment and the client device 102A displays 509 the variant of the web page provided by the content provider 107.

Subsequently, the client device 102A may transmit 519 a second request for the web page to the content provider 101. For example, the user may desire to view the web page again at some later time. The content provider 101 either maintains 521 the previously assigned variant or reassigns the user to a different variant of the web page. As mentioned above, the consistent hash algorithm employed by the content provider 101 to assign users to variants of web pages maintains the initial assignment to a web page if the previously assigned variant of the web page is the "winning" variant in the experiment or will re-assign the user to the "winning" variant if the user was previously assigned to a "non-winning" variant of the web page. By maintaining users that are already assigned to the "winning" variant, the population of the experiment is kept stable regardless of changes made to the experiment such as a modification of weighting applied to the variants of the experiment or removal of a variant from the experiment. The content provider 101 then transmits the variant 523 of the web page to the client device 102A to fulfill the second request for the web page and the client device 102A displays the variant of the web page 525.

Figure 6:
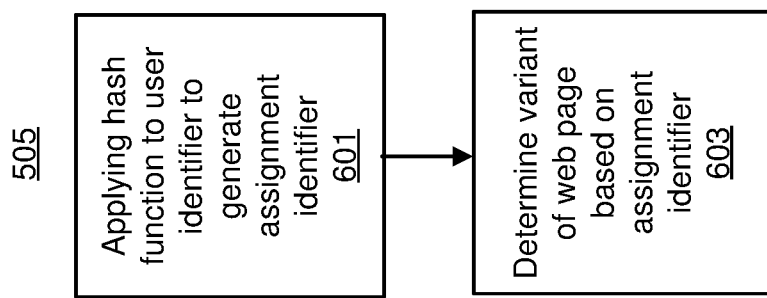
FIG. 6 is a method flow diagram for assigning a variant of a web page to provide to a client device according to one embodiment.

FIG. 6 illustrates one embodiment of a method used by the content provider 101 to assign 505 a variant of the web page to the client device 102A based on the user identifier of the client device 102A. In one embodiment, the content provider 101 applies 601 a weighted consistent hash function to at least the user identifier to generate an assignment identifier for the user. An example of the weighted consistent hash function is the Weighted Rendezvous Hash. The content provider 101 then determines 603 a variant of the web page that is associated with the assignment identifier. For example, the content provider 101 compares the assignment identifier for the user to a rule set for the experiment to select one of the variants from the experiment to assign to the user.

Figure 7:
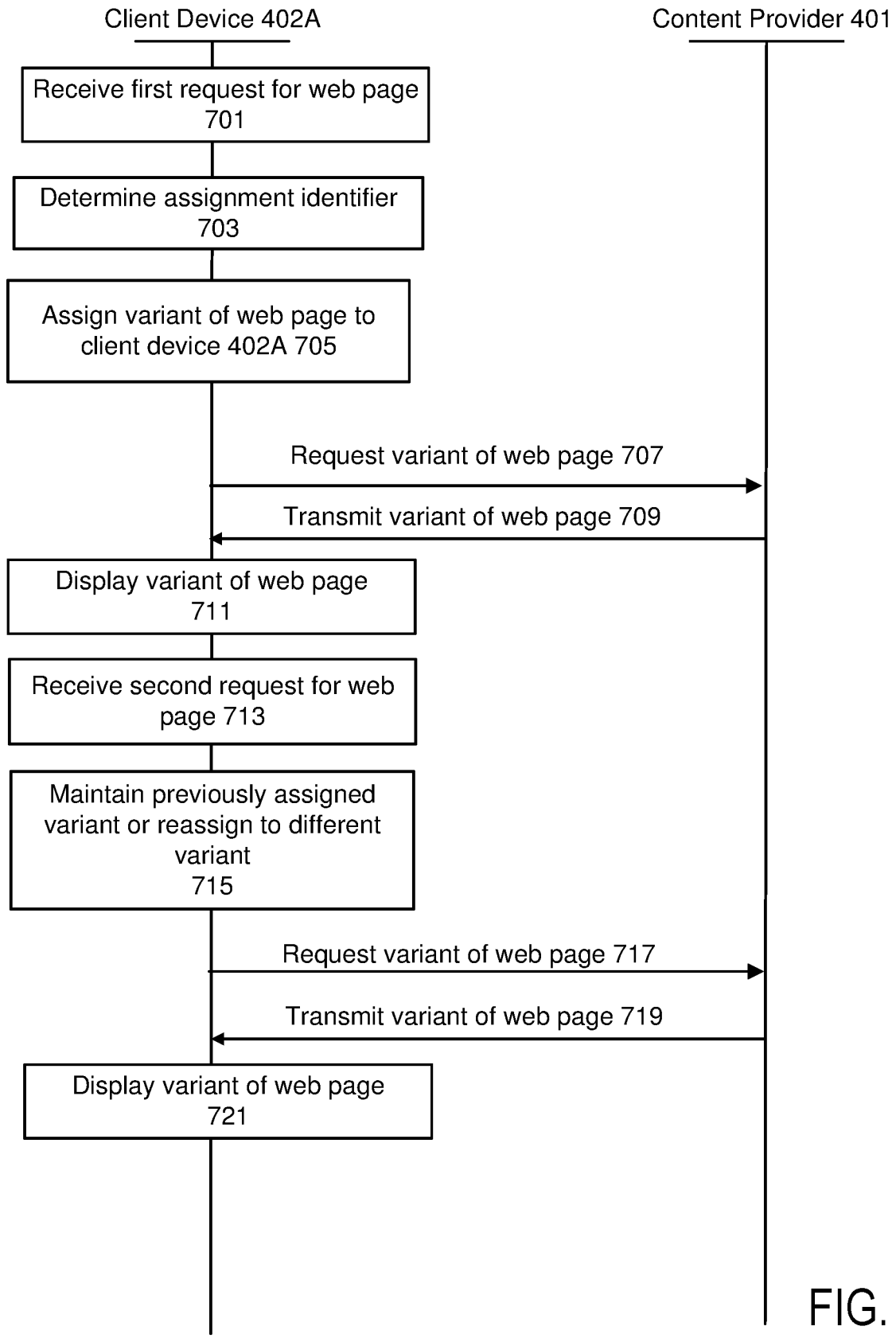
FIG. 7 is an interaction diagram of a process for providing a variation of a web page to a client device according to the embodiment of FIG. 4.

FIG. 7 is an interaction diagram of a process for providing a variation of a web page to a client device 402A according to the embodiment shown in FIG. 4. The interaction diagram illustrates the steps performed by client device 402A and content provider 401 according to one embodiment.

Client device 402A receives a request 701 for a web page from a user of the client device 402A. The client device 402A determines 703 an assignment identifier for the user of the client device 402A. For example, the client device 402A determines the assignment identifier based on the user's user identifier used for logging into the content provider 401. The client device 402A may apply a weighted consistent hash function to the user identifier to generate the assignment identifier.

The client device 402A assigns 705 a variant of the requested web page to the user. The variant is assigned by comparing the assignment identifier with the rule set of the experiment to determine which variant from the multiple variants to assign to the user. The client device 402A transmits 707 a request for the determined variant of the web page to the content provider 401 and the content provider 401 transmits 709 the requested variant of the web page 811 to the client device 402A. The client device 402A displays 711 the variant of the web page provided by the content provider 401.

Subsequently, the client device 402A may receive 711 a second request for the web page from the user. For example, the user may desire see the web page again at some later time. The client device 402A either maintains 715 the previously assigned variant or reassigns the user to a different variant of the web page. As mentioned above, the consistent hash algorithm employed by the client device 402A to assign users to variants of web pages maintains the initial assignment to a web page if the previously assigned variant of the web page is the "winning" variant in the experiment or will re-assign the user to the "winning" variant if the user was previously assigned to a "non-winning" variant of the web page. By maintaining the user in the previously assigned "winning" variant, the population of the experiment is kept stable regardless of changes made to the experiment such as a modification of weighting applied to the variants of the experiment or removal of a variant from the experiment. The client device 402A transmits 717 a request for the determined variant of the web page to the content provider 401 and the content provider 401 transmits 719 the requested variant of the web page to the client device 402A. The client device 402A displays 721 the variant of the web page provided by the content provider 401.

Hardware Components

Figure 8:
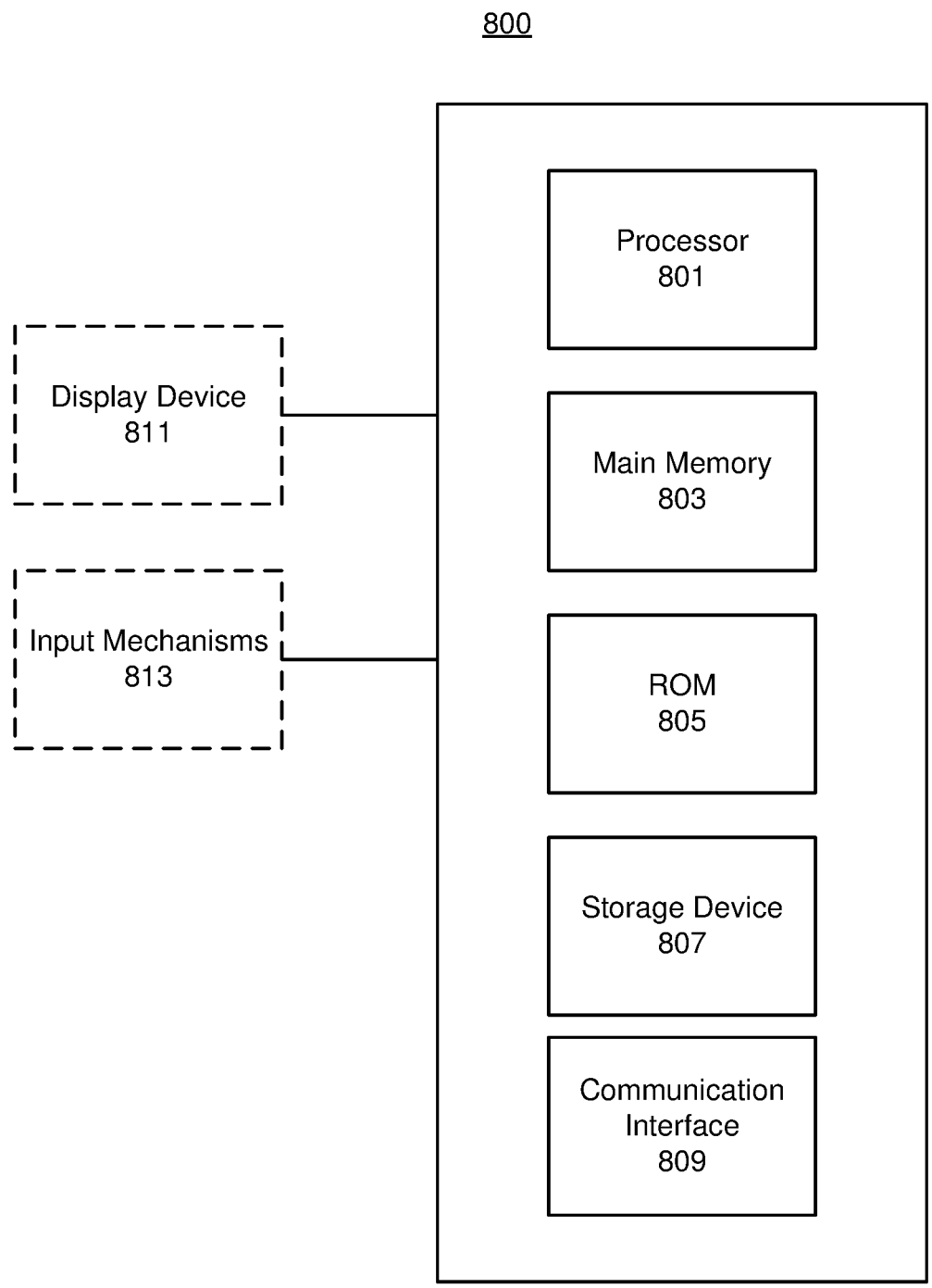
FIG. 8 is system diagram of a computer system, according to one embodiment.

FIG. 8 is a diagram illustrating a computer system 800 upon which embodiments described herein may be implemented within the content provider system 101, 401, and client devices 102, 402. For example, in the context of FIG. 1, the content provider system 101 and client devices 102 may each be implemented using a computer system such as described by FIG. 8. The content provider system 101 and/or client devices 102 may also be implemented using a combination of multiple computer systems as described by FIG. 8.

In one implementation, content provider system 101 and/or client devices 102 each include processing resources 801, main memory 803, read only memory (ROM) 805, storage device 807, and a communication interface 809. The content provider system 101 and/or client devices 102 include at least one processor 801 for processing information and a main memory 803, such as a random access memory (RAM) or other dynamic storage device, for storing information and instructions to be executed by the processor 801. In one embodiment, multiple processors are employed by the content provider system 101 and/or client devices 102 to perform the techniques described above in order to improve efficiency of the content provider system 101 and/or client devices 102 and reduce computation time when assigning variants. Main memory 803 also may be used for storing temporary variables or other intermediate information during execution of instructions to be executed by processor 801. Content provider system 101 and/or client devices 102 may each also include ROM 805 or other static storage device for storing static information and instructions for processor 801. The storage device 807, such as a magnetic disk or optical disk or solid state memory device, is provided for storing information and instructions.

The communication interface 809 can enable each of the content provider system 101 and/or client devices 102 to communicate with each other through use of a communication link (wireless or wireline). Each of the content provider system 101 and/or client devices 102 can optionally include a display device 811, such as a cathode ray tube (CRT), an LCD monitor, an LED monitor, OLED monitor, a TFT display or a television set, for example, for displaying graphics and information to a user. An input mechanism 813, such as a keyboard that includes alphanumeric keys and other keys, can optionally be coupled to the computer system 800 for communicating information and command selections to processor 801. Other non-limiting, illustrative examples of input mechanisms 813 include a mouse, a trackball, touch-sensitive screen, or cursor direction keys for communicating direction information and command selections to processor 801 and for controlling cursor movement on display device 811.

Examples described herein are related to the use of the content provider system 101 and/or client devices 102 for implementing the techniques described herein. According to one embodiment, those techniques are performed by each of the content provider system 101 and/or client devices 102 in response to processor 801 executing one or more sequences of one or more instructions contained in main memory 803. Such instructions may be read into main memory 803 from another machine-readable medium, such as storage device 807. Execution of the sequences of instructions contained in main memory 803 causes processor 801 to perform the process steps described herein. In alternative implementations, hard-wired circuitry may be used in place of or in combination with software instructions to implement examples described herein. Thus, the examples described are not limited to any specific combination of hardware circuitry and software. Furthermore, it has also proven convenient at times, to refer to arrangements of operations as modules, without loss of generality. The described operations and their associated modules may be embodied in software, firmware, hardware, or any combinations thereof.

Reference in the specification to "one embodiment" or to "an embodiment" means that a particular feature, structure, or characteristic is included in at least one embodiment of the disclosure. The appearances of the phrase "in one embodiment" or "a preferred embodiment" in various places in the specification are not necessarily referring to the same embodiment.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects disclosed herein include process steps and instructions described herein in the form of a method. It should be noted that the process steps and instructions described herein can be embodied in software, firmware or hardware, and when embodied in software, can be downloaded to reside on and be operated from different platforms used by a variety of operating systems.

The embodiments discussed above also relates to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the embodiments are not described with reference to any particular programming language. It will be appreciated that a variety of programming languages may be used to implement the teachings described herein, and any references below to specific languages are provided for disclosure of enablement and best mode.

While the disclosure has been particularly shown and described with reference to a preferred embodiment and several alternate embodiments, it will be understood by persons skilled in the relevant art that various changes in form and details can be made therein without departing from the spirit and scope of the invention.

What is claimed is:

1. A computer-implemented method for determining a variant of a content item to provide to a client device, the method comprising:
   receiving a first request for a content item from a client device, the content item associated with a plurality of different variants of the content item;
   assigning a variant from the plurality of different variants of the content item to a user of the client device;
   transmitting the assigned variant of the content item to the client device for display on the client device;
   receiving a second request for the content item from the client device, the second request received subsequent to the first request;
   calculating a performance of each of the plurality of different variants of the content item responsive to the second request;
   selecting either the assigned variant of the content item or another variant from the plurality of different variants of the content item to transmit to the client device based on the calculated performance of each of the plurality of different variants; and
   transmitting the selected variant of the content item to the client device.

2. The computer implemented method of claim 1, wherein assigning the variant comprises:
   applying a weighted consistent hash function to a combination of an identifier associated with the client device and at least one of an identifier of an experiment associated with the content item or an attribute of the user to generate an assignment identifier of the client device; and
   assigning the variant of the content item from the plurality of different variants of the content item based on the assignment identifier.

3. The computer-implemented method of claim 1, further comprising:
   monitoring interactions with the plurality of different variants by a plurality of different client devices; and
   determining performances of the plurality of different variants with respect to one or more metrics.

4. The computer-implemented method of claim 3, wherein selecting either the assigned variant or the other variant comprises:
   identifying a variant with a highest performance amongst the plurality of different variants;
   selecting the assigned variant to the client device responsive to the assigned variant being the identified variant with the highest performance; and
   selecting the variant with the highest performance responsive to the previously assigned variant lacking the highest performance.

5. The computer-implemented method of claim 4, wherein the variant with the highest performance is the variant amongst the plurality of different variants with a highest percentage of conversions.

6. The computer-implemented method of claim 2, further comprising:
   storing a ruleset for the content item, the ruleset including one or more rules that describe which variant of the content item to assign to the client device; and
   comparing the assignment identifier associated with the client device to the ruleset;
   wherein the variant of the content item is assigned based on the comparison.

7. The computer-implemented method of claim 6, wherein comparing the assignment identifier comprises:
   comparing the assignment identifier to a plurality of ranges of assignment identifiers, each range of assignment identifiers associated with a corresponding one of the plurality of different variants; and
   identifying a range of assignment identifiers from the plurality of assignment identifiers that includes the assignment identifier based on the comparison;
   wherein the variant that is associated with the identified range is assigned to the client device.

8. A computer program product comprising a non-transitory computer-readable storage medium storing executable code determining a variant of a content item to provide to a client device, the code when executed causing a computer to perform steps comprising:
   receiving a first request for a content item from a client device, the content item associated with a plurality of different variants of the content item;
   assigning a variant from the plurality of different variants of the content item to a user of the client device;
   transmitting the assigned variant of the content item to the client device;
   receiving a second request for the content item from the client device, the second request received subsequent to the first request;

calculating a performance of each of the plurality of different variants of the content item responsive to the second request;

selecting either the assigned variant of the content item or another variant from the plurality of different variants of the content item to transmit to the client device based on the calculated performance of each of the plurality of different variants; and transmitting the selected variant of the content item to the client device.

9. The computer program product of claim 8, wherein assigning the variant comprises:

applying a weighted consistent hash function to a combination of an identifier associated with the client device and at least one of an identifier of an experiment associated with the content item or an attribute of the user to generate an assignment identifier of the client device; and assigning the variant of the content item from the plurality of different variants of the content item based on the assignment identifier.

10. The computer program product of claim 8, the code when executed further causing the computer to perform steps comprising:

monitoring interactions with the plurality of different variants by a plurality of different client devices; and determining performances of the plurality of different variants with respect to one or more metrics.

11. The computer program product of claim 10, wherein selecting either the assigned variant or the other variant comprises:

identifying a variant with a highest performance amongst the plurality of different variants;

selecting the assigned variant to the client device responsive to the assigned variant being the identified variant with the highest performance; and selecting the variant with the highest performance responsive to the previously assigned variant lacking the highest performance.

12. The computer program product of claim 11, wherein the variant with the highest performance is the variant amongst the plurality of different variants with a highest percentage of conversions.

13. The computer program product of claim 9, the code when executed further causing the computer to perform steps comprising:

storing a ruleset for the content item, the ruleset including one or more rules that describe which variant of the content item to assign to the client device; and comparing the assignment identifier associated with the client device to the ruleset;

wherein the variant of the content item is assigned based on the comparison.

14. The computer program product of claim 13, wherein comparing the assignment identifier comprises:

comparing the assignment identifier to a plurality of ranges of assignment identifiers, each range of assignment identifiers associated with a corresponding one of the plurality of different variants; and identifying a range of assignment identifiers from the plurality of assignment identifiers that includes the assignment identifier;

wherein the variant that is associated with the identified range is assigned to the client device.

15. A computer system for determining a variant of a content item to provide to a client device, the computer system comprising:

a computer processor;

a non-transitory computer-readable storage medium storing executable code, the code when executed by the computer processor causes the computer processor to perform steps comprising:

receiving a first request for a content item from a client device, the content item associated with a plurality of different variants of the content item;

assigning a variant from the plurality of different variants of the content item to a user of the client device;

transmitting the assigned variant of the content item to the client device;

receiving a second request for the content item from the client device, the second request received subsequent to the first request;

calculating a performance of each of the plurality of different variants of the content item responsive to the second request;

selecting either the assigned variant of the content item or another variant from the plurality of different variants of the content item to transmit to the client device based on the calculated performance of each of the plurality of different variants; and transmitting the selected variant of the content item to the client device.

16. The computer system of claim 15, wherein assigning the variant comprises:

applying a weighted consistent hash function to a combination of an identifier associated with the client device and at least one of an identifier of an experiment associated with the content item or an attribute of the user to generate an assignment identifier of the client device; and assigning the variant of the content item from the plurality of different variants of the content item based on the assignment identifier.

17. The computer system of claim 15, the code when executed further causing the computer processor to perform steps comprising:

monitoring interactions with the plurality of different variants by a plurality of different client devices; and determining performances of the plurality of different variants with respect to one or more metrics.

18. The computer system of claim 17, wherein selecting either the assigned variant or the other variant comprises:

identifying a variant with a highest performance amongst the plurality of different variants;

selecting the assigned variant to the client device responsive to the assigned variant being the identified variant with the highest performance; and selecting the variant with the highest performance responsive to the previously assigned variant lacking the highest performance.

19. The computer system of claim 18, wherein the variant with the highest performance is the variant amongst the plurality of different variants with a highest percentage of conversions.

20. The computer system of claim 15, the code when executed further causing the computer processor to perform steps comprising:

storing a ruleset for the content item, the ruleset including one or more rules that describe which variant of the content item to assign to the client device; and comparing the assignment identifier associated with the client device to the ruleset;

wherein the variant of the content item is assigned based on the comparison.

* * * * *